J. AND J. G. GRAY.
GYROSCOPIC APPARATUS.
APPLICATION FILED OCT. 14, 1918.

1,308,783.

Patented July 8, 1919.
3 SHEETS—SHEET 1.

Inventors:
John Gray
James Gordon Gray,
by Robert Walter,
Attorneys

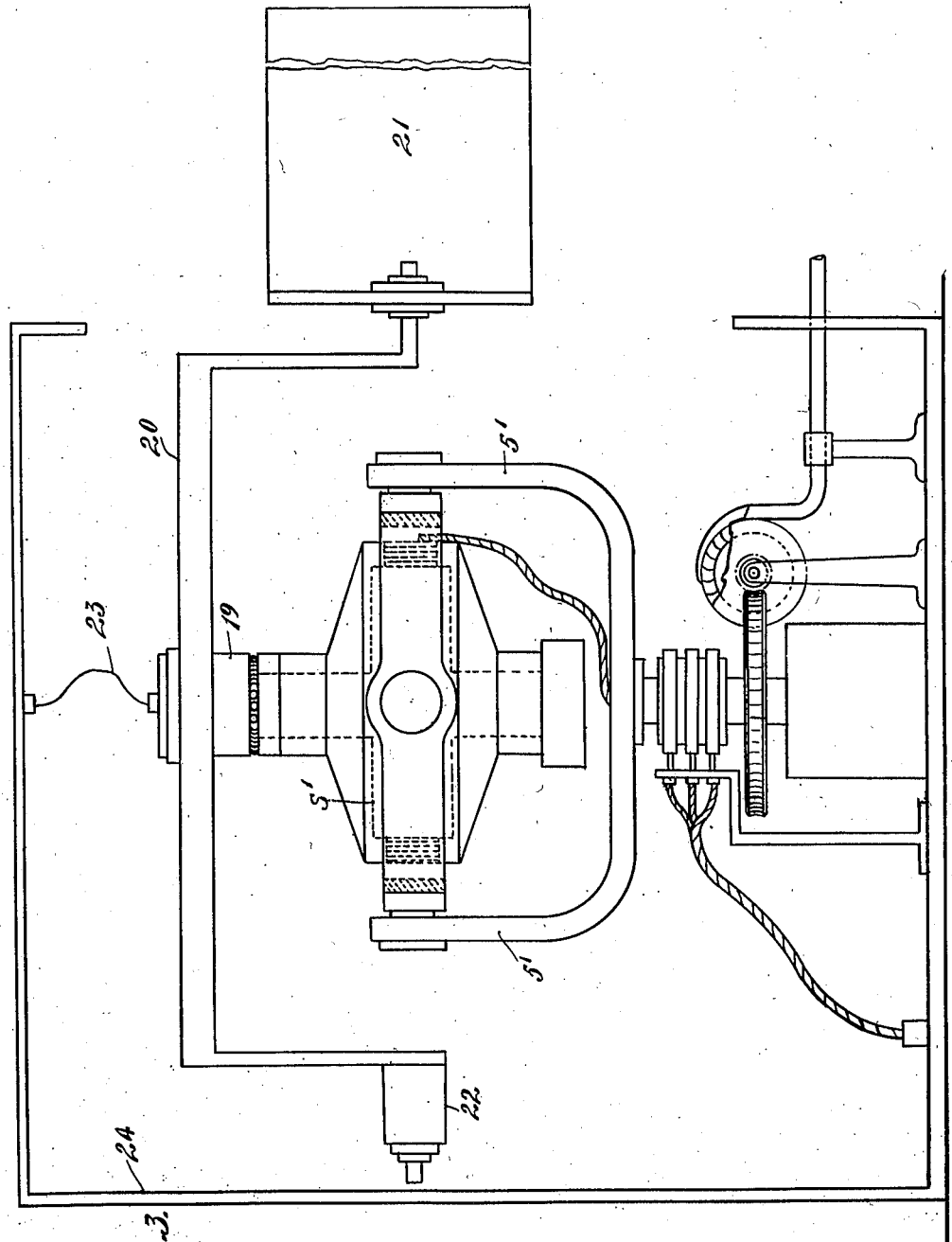

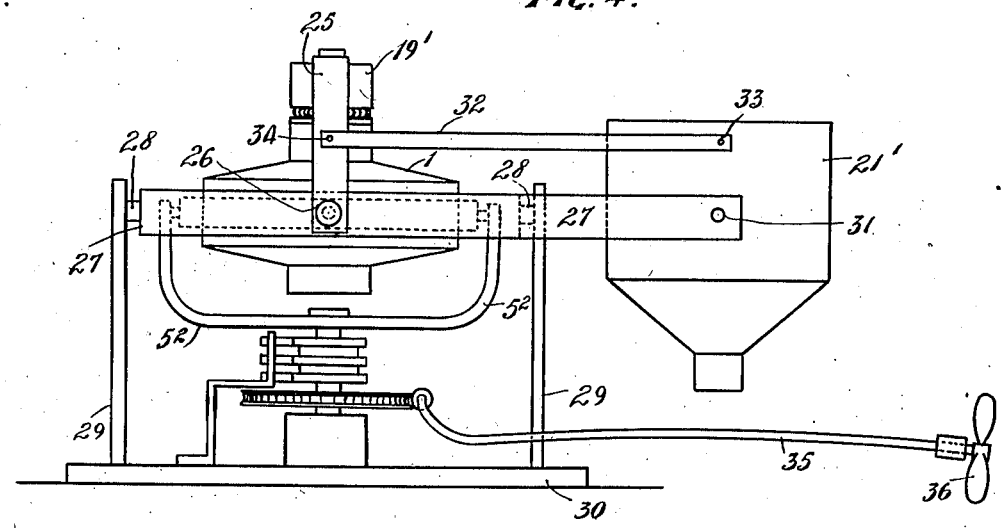

UNITED STATES PATENT OFFICE.

JOHN GRAY, OF LONDON, ENGLAND, AND JAMES GORDON GRAY, OF GLASGOW, SCOTLAND.

GYROSCOPIC APPARATUS.

1,308,783.　　　　　Specification of Letters Patent.　　　Patented July 8, 1919.

Application filed October 14, 1918. Serial No. 258,124.

*To all whom it may concern:*

Be it known that we, JOHN GRAY and JAMES GORDON GRAY, subjects of the King of the United Kingdom of Great Britain and Ireland, and residing at London, England, and Glasgow, Scotland, respectively, have invented a certain new and useful Improvement in Gyroscopic Apparatus, of which the following is a specification.

This invention relates to gyroscopic apparatus adapted *inter alia* to serve as a stabilizer for use on a moving body, such as an aeroplane, airship or battleship, which shall set itself truly vertical on the moving body, shall be practically unaffected by motions of the said body, and, if disturbed from the vertical position, shall restore itself to its normal, that is, vertical position. The said apparatus may be used for many purposes, notably for indicating the vertical on aircraft, and for stabilizing instruments of precision, such as bomb sights, cameras and the like.

Figure 1:
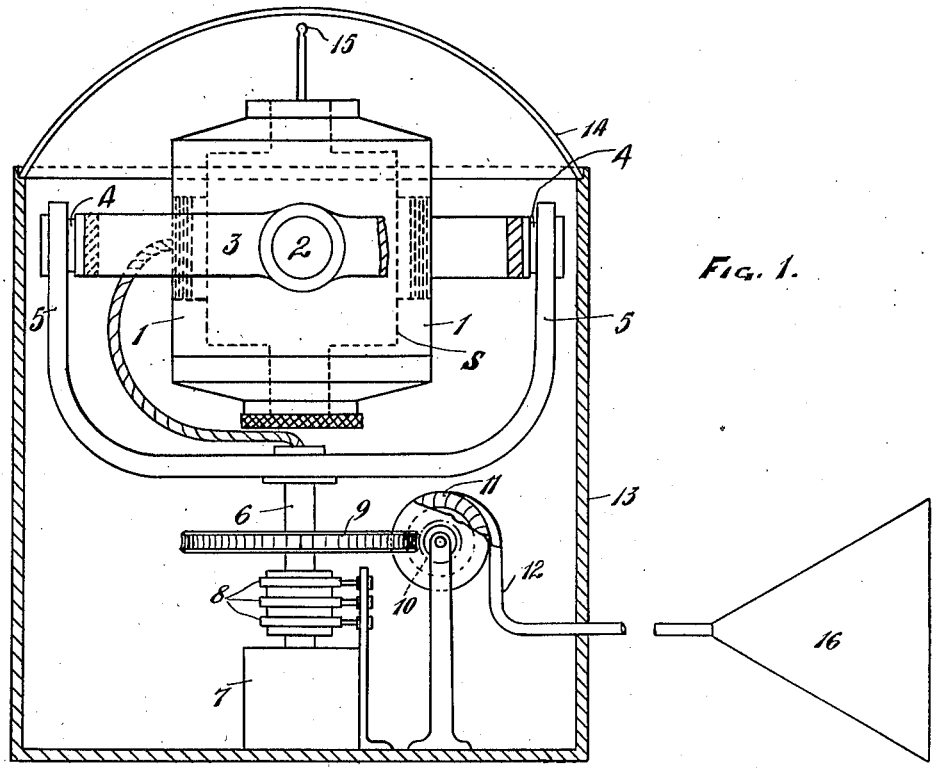
Figure 2:
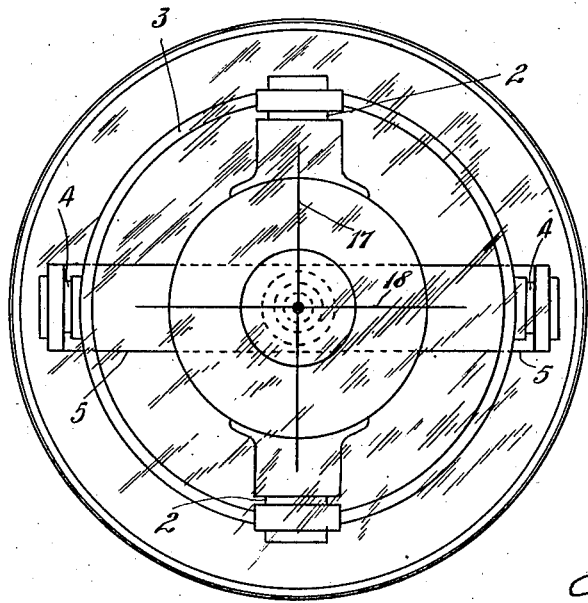

In the accompanying drawings which illustrate the invention Figure 1 is an elevation and Fig. 2 a plan of a gyroscopic level designed for use in aeroplanes. Fig. 3 is an elevation showing the invention adapted as a stabilizer for a bomb sight or camera. Fig. 4 shows a modification.

Referring to Figs. 1 and 2, the casing 1 of a gyroscope is pivoted at 2, 2 to a gimbal ring or frame 3, which, in turn, is pivoted at 4, 4 to upright arms 5, 5 of a fork. The axes of the pivots 2, 2 and 4, 4 are in the same horizontal plane, the axis of the pivots 2, 2 being perpendicular to the axis of rotation of the spinning element S. The fork is carried on a spindle 6 which is mounted in a pedestal bearing 7. The spindle carries three slip rings 8, 8, 8 for conveying three-phase current to the gyroscope (which may, however, be otherwise driven) and also a worm wheel 9. The worm wheel 9 meshes with a worm 10 which is rotatable with a turbine wheel 11 driven by a current of air supplied through a tube 12. The air for rotating the turbine wheel may enter a scoop 16 exposed to the rush of air past the fuselage of the aeroplane and connected to the pipe 12. The apparatus so far described with the exception of the scoop 16 is inclosed within a case 13 fitted with a dome 14 composed of thin transparent glass or other transparent material. Engraved on the glass dome are two lines 17 and 18, one of which is disposed longitudinally and the other transversely of the aeroplane. Attached to the top of the gyroscope casing 1 is a centrally disposed upright rod terminating in a bead 15 which, when the case 13 and the gyroscope are both vertical, lies just below the intersection of the lines 17, 18.

The apparatus is preferably adjusted so that the center of gravity of the gyroscope and its casing lies very slightly below the intersection of the gimbal axes. Thus, when the spinning element S is spinning, its precessional period is very long. When the apparatus is in use, the spinning element S is spun rapidly and the spindle 6 rotated in the same circular direction as the spinning element S. Under these conditions the equilibrium position of the gyroscope is that in which the axis of spin is vertical and the inclination of the aeroplane is indicated by the movement of the lines 17, 18 relatively to the bead 15.

If we suppose the pivots 4, 4 locked and the spindle 6 rotated in the direction of spin of the spinning element S then the equilibrium position of the gyroscope is that in which its axis is perpendicular to the plane of the rotating gimbal ring 3. When the pivots 4, 4 are free, the friction at these pivots causes a certain amount of locking action, and the gyroscope is stabilized into the vertical. When the axis of the gyroscope is inclined to the vertical, the gimbal ring 3, in consequence of the rotation of the fork 5, 5, oscillates to and fro on the pivots 4, 4, and couples are applied to the casing 1 of the gyroscope which restore the latter into the vertically gyroscopic action.

If the apparatus be adjusted so that the center of gravity of the gyroscope and its casing is above the intersection of the gimbal axes, the equilibrium position, with the direction of rotation of the fork and gimbal ring specified, is again that in which the axis of the gyroscope is vertical. If the center of gravity of the gyroscope and casing lie at the intersection of the gimbal axes, the equilibrium position of the gyroscope is that in which its axis is parallel to or coincident with that of the spindle 6. If the spindle 6 be inclined to the vertical and the gyroscope be provided with a certain amount of gravity control, corresponding to a very long precessional period, the gyroscope takes up a position in which its axis is very slightly inclined to the vertical; with good construction the inclination will be very small.

With this apparatus, if the gyroscope be tilted, it returns slowly to the vertical. No advantage is gained by rotating the spindle 6 very rapidly; a speed of from 50 to 100 revolutions per minute of the spindle 6 is quite sufficient.

When this apparatus is mounted on an aeroplane which is rounding a curve the gyroscope tends to place itself so that the axis of spin lies along the apparent vertical; but the direction of the apparent vertical is continually changing, and, moreover, the speed at which the gyroscope moves toward the apparent vertical is very slow, with the result that in practice the true vertical is never appreciably departed from.

The arrangement of the apparatus shown in Fig. 3 is entirely similar to that shown in Figs. 1 and 2. Attached to the upper part of the gyroscope casing is a sleeve 19, to which is attached a frame 20 carrying the sight or camera 21, and compensating weight 22. The sleeve 19 is prevented from rotating by the flexible wire 23, one end of which is attached to the sleeve and the other to a point in the containing case 24. The spinning element S' is spun rapidly and the fork 5' is rotated in the same circular direction as the spinning element. The apparatus being adjusted so that the center of gravity of the pivoted system lies just below the intersection of the gimbal axes, the arrangement is stabilized into the vertical. The sleeve 19 and consequently the sight 21 partake of all the motions of the gyroscope casing with the exception of the rotation; that is, the sight is maintained upright.

The arrangement of the apparatus shown in Fig. 4 is entirely similar to that shown in Figs. 1, 2 and 3, with some additions. Attached to the upper part of the gyroscope casing 1 is a sleeve 19' to which is attached a fork 25. The extremities of this fork 25 are pivoted as at 26 to a frame 27 pivoted at 28, 28, to uprights 29, 29, carried by a base 30. The frame 27 is provided with two arms and within these is pivoted as at 31 the sight or camera 21' to be stabilized. The camera 21' is connected to the fork 25 by means of a connecting rod 32 and pivots 33, 34. The fork $5^2$ is rotated in the direction of spin of the gyroscope flywheel by means of a worm and driven wheel. The worm may be rotated by any convenient means; it is shown connected by means of a flexible shaft 35 to an air-screw 36 which is spun by the flow of air past the aeroplane. The fork 25 is prevented from turning by the pivots 26, but it partakes of all the motions of the gyroscope casing with the exception of its rotation. The turning of the fork $5^2$ results in the gyroscope being stabilized into the vertical. Moreover, the sight or camera 21' is maintained parallel to the fork 25 by the connecting rod 32. If the uprights 29 lie fore and aft on the aeroplane or other moving body, the frame 27 is stabilized against rolling motions, and the sight or camera against both rolling and pitching motions.

What we claim is:—

1. The herein described gyroscopic apparatus, comprising, in combination, a gyroscope including a casing and a spinning element rotatably around a normally substantially vertical axis relatively to said casing, a normally horizontal gimbal frame in which said casing is pivotally mounted, a frame member to which said gimbal frame is pivoted, and means for effecting rotation of said frame member around a normally vertical axis in the same circular direction as said spinning element but at less speed.

2. The herein described gyroscope apparatus, comprising, in combination, a gyroscope including a casing and a spinning element rotatable around a normally substantially vertical axis relatively to said casing, a normally horizontal gimbal frame in which said casing is pivotally mounted, a normally vertical forked member to which said gimbal frame is pivoted, a normally vertical spindle carrying said forked member, and means for effecting rotation of said spindle in the same circular direction as said spinning element.

3. The herein described gyroscope apparatus, comprising, in combination, a gyroscope including a casing and a spinning element rotatable around a normally substantially vertical axis relatively to said casing, a normally horizontal gimbal frame in which said casing is pivotally mounted, a frame member to which said gimbal frame is pivoted, a normally vertical spindle carrying said frame member, a worm wheel on said spindle, a worm meshing with said worm wheel, and an air-driven element operatively connected with said worm and serving to effect rotation of said spindle in the same circular direction as said spinning element.

In testimony whereof we have signed our names to this specification in the presence of two subscribing witnesses.

JOHN GRAY.
JAMES GORDON GRAY.

Witnesses:
HENRY MASON,
FLORENCE HOUSTON.